Aug. 11, 1925.
W. DAVIS
1,549,348
DUAL CONTROLLING DEVICE FOR MOTOR VEHICLES
Filed April 15, 1925    2 Sheets-Sheet 1
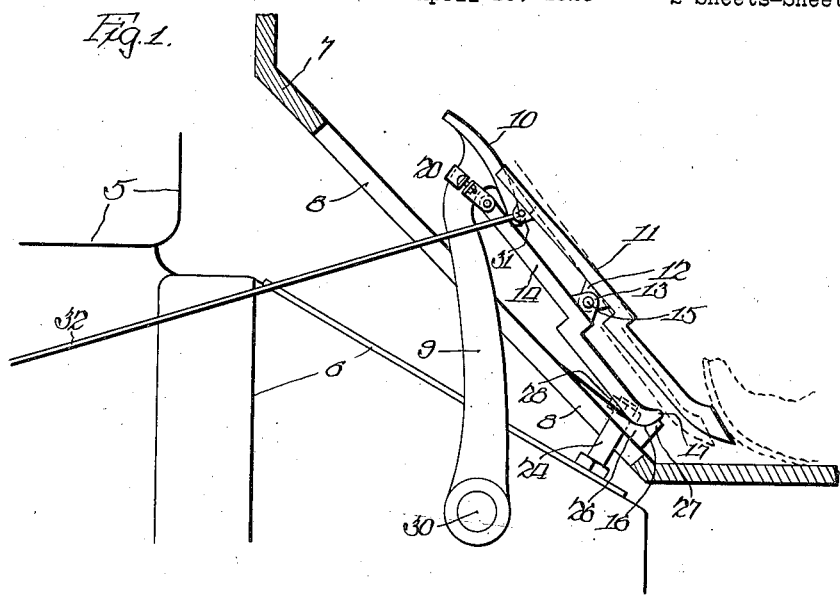
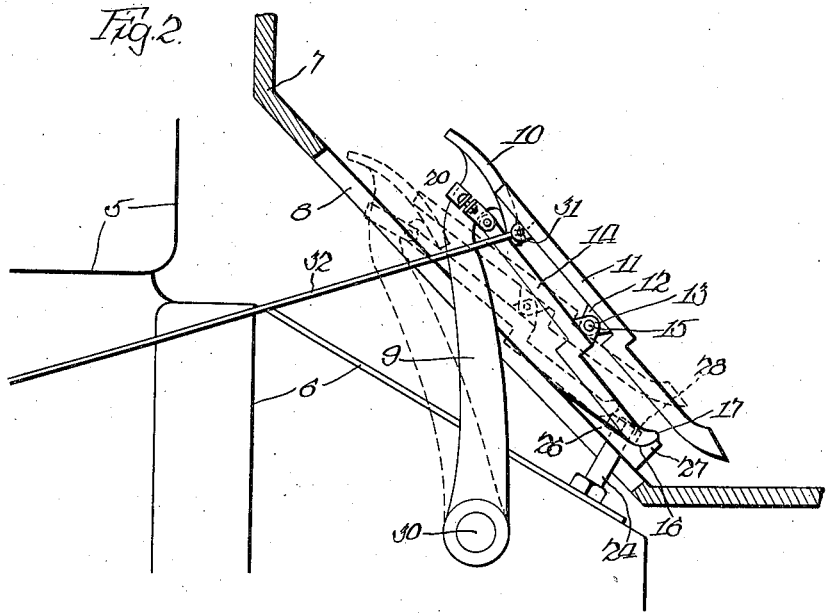
Inventor
William Davis
By Chas. C. Tillman
Atty.

Aug. 11, 1925.  W. DAVIS  1,549,348
DUAL CONTROLLING DEVICE FOR MOTOR VEHICLES
Filed April 15, 1925  2 Sheets-Sheet 2
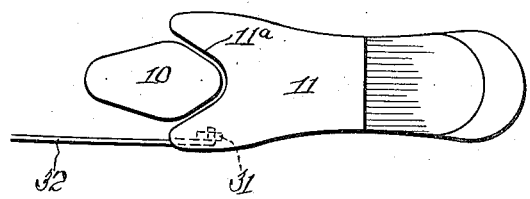
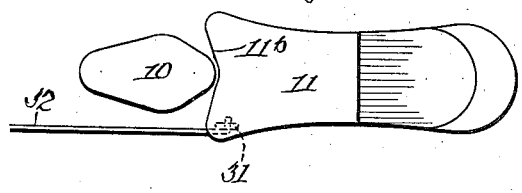
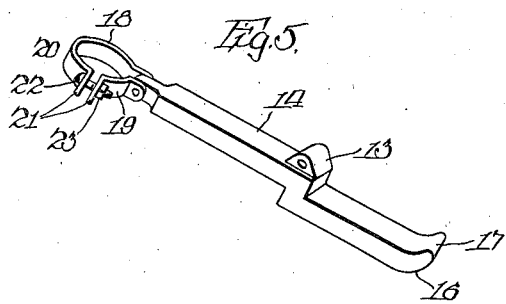
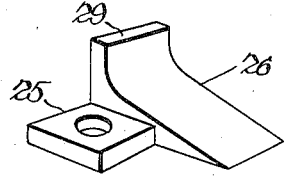
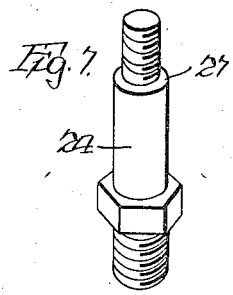
Inventor:
William Davis:
By Chas. P. Tillman
Atty.

Patented Aug. 11, 1925.

1,549,348

UNITED STATES PATENT OFFICE.

WILLIAM DAVIS, OF CHICAGO, ILLINOIS.

DUAL CONTROLLING DEVICE FOR MOTOR VEHICLES.

Application filed April 15, 1925. Serial No. 23,277.

*To all whom it may concern:*

Be it known that I, WILLIAM DAVIS, a citizen of the United States, residing at Chicago, in the county of Cook and State of Illinois, have invented certain new and useful Improvements in a Dual Controlling Device for Motor Vehicles, of which the following is a specification.

The present invention relates to controlling mechanism for motor vehicles, and embodies improvements in or over the structure disclosed in Letters Patent No. 1,527,152 issued to me on the 17th day of February, 1925, for improvements in a dual controlling device for motor vehicles, and also improvements in or over the device shown and described in my co-pending application for Letters Patent Serial Number 17,512 filed March 23, 1925, for improvements in dual controlling device for motor vehicles, and like said patented structure or invention, as well as like that of my said pending application, has among its general objects the same as those therein set forth, which objects it is not deemed necessary to herein repeat or particularize.

In addition thereto, my present invention contemplates the provision in a foot operated controlling mechanism for the motors of vehicles, of means whereby the supporting member or arm for the foot rest or pedal of the device, will be carried at one of its ends by the lever of the brake mechanism of the vehicle, and so supported at its other end as to normally hold said pedal in a position substantially parallel with the upwardly and forwardly inclined foot board or portion of the body of the vehicle and arranged with respect to the upper end of said brake lever and in such association therewith that the whole weight of the foot can be supported by said pedal and lever in a comfortable and bodily movable manner, yet so that in the movement of the pedal, the supporting arm therefor and the brake lever from the normal position of the former and from the brake released position of the lever, in the operation of applying the brakes, substantially the relative normal position of the pedal with respect to the said inclined portion of the floor of the vehicle will be maintained and the pressure of the foot distributed between the said lever and pedal, at the same time affording means whereby, when the parts are in their normal positions, the pedal can be independently operated for actuating the accelerator by the toe of the foot while the latter rests on the vehicle floor.

The present invention is more particularly intended for use in connection with a motor driven vehicle of the Ford type but not restricted thereto.

As the specific or particular form of the mechanism for operating the accelerator forms no part of the present invention, but as any suitable means for such purpose may be employed, I have not deemed it necessary to illustrate the same, but have shown in the drawings only such parts to which the present invention is directed and will hereinafter describe them.

In the accompanying drawings,—

Fig. 1 is a view in side elevation of a portion of the engine, a part of the transmission case and a fragment of the body of an automobile of the Ford type showing an embodiment of the present invention mounted on the brake lever and on the inclined portion or foot board of said body, illustrating the parts by continuous lines in their normal positions and by dotted lines a position which the pedal may be caused to assume when it is desired to operate the accelerator by means of the foot resting on the horizontal portion of the vehicle body.

Fig. 2 is a similar view of like parts to that shown in Fig. 1 illustrating by dotted lines positions the parts may be caused to assume when applying the brakes.

Fig. 3 is a plan view of the upper end of the brake lever and the pedal showing one form of the construction of the latter for closely associating it with the upper end of said lever.

Fig. 4 is a similar view showing a modification in the construction of the pedal.

Fig. 5 is a detached perspective view slightly enlarged, of the pedal supporting arm of the device.

Fig. 6 is a similar view of a member employed to co-act with the lower end of the supporting arm for restricting its movement in one direction and for changing the position of the pivot point of the pedal as well as the position of the pedal itself in the operation of applying the brakes, and Fig. 7 is a detached perspective view of a support or standard employed to connect the last named member to the crank case of the vehicle or any other suitable part.

Corresponding numerals of reference refer to like parts throughout the different views of the drawings.

The reference numeral 5 designates a portion of the engine, 6 a part of the transmission casing, and 7 a fragment of the body and inclined foot board portion of a vehicle or automobile of the Ford type, which body may be mounted on the frame of the vehicle in the ordinary or well known way. The upwardly inclined foot board of said body is provided with a vertically disposed slot 8 which is located above the transmission case 6 and near the side thereof on which the brake lever 9 is mounted, and as shown, said slot extends from the lower part or extremity of the inclined foot board to near the upper extremity thereof, and has extended therethrough the brake lever 9 which is by preference provided at its upper end with an elongated enlargement or head 10 to provide a foot rest for one of the feet of the chauffeur or driver, and for co-operation with the upper end of a pedal designated as a whole by the numeral 11, which end of said pedal is by preference provided with a recess 11ª to receive a portion of the head 10 in such a way that the pedal and said head shall be located in close proximity with one another yet in such a way that each may have an independent movement. The pedal 11 is provided between its ends with a downwardly extended and transversely apertured lug 12 which is pivotally connected to an upwardly extending and transversely apertured lug 13 carried by a pedal supporting arm 14 between the ends thereof by means of a pivot 15 extended through the openings in said lugs. Instead of employing the deep recess 11ª in the upper end of the pedal 11 as shown in Fig. 3 of the drawings, the said end of the pedal may be provided with a shallow depression or recess 11ᵇ as shown in Fig. 4 of the drawings, by means of which it will be understood that either construction of the pedal will enable the same to be tilted on its fulcrum or moved bodily independently of the brake lever. The supporting arm 14 is by preference provided at about its middle with a horizontal offset located beneath and a slight distance forwardly of a similar offset in the pedal 11, which latter offset provides a shoulder against which the front portion of the heel of the shoe of the operator may rest. The lower end of the supporting arm 14 is by preference slightly rounded as at 16, see Figs. 1, 2 and 5 of the drawings, and has at said end an upwardly extended projection 17, which rounded portion and projection co-act with another part of the device for the purposes to be presently explained. The upper end of the supporting arm 14 has pivotally secured thereto an end of each of the members 18 and 19 of a clamp or collar designated as a whole by the numeral 20, each of which off members is provided at its other end with an outwardly extended apertured flange 21, through which openings a screw-bolt 22 is passed and employed in connection with a nut 23 engaging said bolt for rigidly holding the clamp 20 on the upper portion of the brake lever 9 at a suitable point below the head 10 thereof. A screw-threaded bolt 24 in engagement at its lower end with the top of the transmission casing 6 is extended upwardly through the lower portion of the slot 8 of the foot rest 7 of the vehicle body and a vertically apertured portion 25 of a cam-faced plate 26 is placed on the upper portion of the bolt 24 so as to rest on the shoulder 27 of said bolt, in which position it may be securely held by means of a nut 28 engaging the upper screw-threaded portion of said bolt.

It will be understood that the part 25 is integral with the plate 26 at one of the side edges thereof and that when positioned as above explained, the portion 25 as well as the plate 26, will be disposed on the upper surface of the lower portion of the inclined foot rest 11 of the vehicle body and over the slot 8 therein, thus providing an inclined surface for co-operation with the lower portion of the lower end of the pedal supporting arm 14, which arm as before stated, is mounted at its upper end for pivotal movement on the upper portion of the brake lever and as shown in Figs. 1 and 2 of the drawings, lies directly over the slot 8 in the foot board of the vehicle body, thus holding the pedal 11 in a similarly disposed position. To restrict the rearward movement of the supporting arm 14 as well as that of the brake lever 9, the plate 26 is provided with an upward extension or stop 29 against which the projection 17 of the supporting arm will contact in its rearward movement, as is obvious.

It will be understood that the brake lever 9 is mounted on a shaft 30 transversely journaled in the casing 6 and that the brake mechanism operated by said lever may be of the well known kind employed in the Ford type of vehicles or of any other type in which a brake lever having back and forth movement for applying and releasing the brakes is employed.

Loosely or pivotally connected at one of its ends to a depending lug 31 on the lower front portion of the pedal 11 and preferably at one side thereof is one end of a connection 32 such as a rod, a cable or flexible wire, which leads to the valve of an accelerator not shown, or to a mechanism of the construction shown in my aforesaid patent, if desired, for operating said valve by proper manipulation of the pedal, or a device other than an accelerator to be operated by the pedal 11 through its connection 32 may be employed.

It will be understood that the springs employed to retract the accelerator valve and the brake actuating lever will act through the connections with the pedal to place and hold it in its normal position after pressure is removed therefrom.

Having thus fully described my invention, what I claim as new and desire to secure by Letters Patent is: —

1. A device of the class described, including in combination with an upwardly extended brake actuating lever, a pedal supporting arm pivotally connected to said lever near the upper end thereof and slidably mounted at its lower portion, and a pedal longitudinally disposed above said arm, said pedal pivotally mounted between its ends on and between the ends of said arm.

2. A device of the class described, including in combination with an upwardly extended brake actuating lever, a pedal supporting arm pivotally connected to said lever near the upper end thereof and slidably mounted at its lower portion, and a pedal longitudinally disposed above said arm with its upper end in close proximity to the upper end of said lever, said pedal pivotally mounted between its ends on and between the ends of said arm.

3. A device of the class described, including in combination with an upwardly extended brake actuating lever, a pedal supporting arm pivotally connected at a fixed point to said lever near the upper end thereof and slidably mounted at its lower portion, a pedal longitudinally disposed above said arm, said pedal pivotally mounted between its ends on and between the ends of said arm, and a connection operatively uniting said pedal to a part to be operated upon its movement in one direction.

4. In a device of the class described, the combination with an upwardly extended brake actuating lever, of a pedal supporting arm pivotally connected to said lever at a fixed point near the upper end thereof and slidably mounted at its lower portion, a stop mounted at the lower portion of said arm to restrict its movement rearwardly, a pedal longitudinally disposed above said arm, said pedal pivotally mounted between its ends on and between the ends of said arm, and a connection operatively uniting said pedal to a part to be operated upon its movement in one direction.

5. In a device of the class described, the combination with an upwardly extended brake actuating lever, of a pedal supporting arm pivotally connected to said lever at a fixed point near the upper end thereof and extended downwardly and rearwardly from said lever, a member having its upper surface forwardly and upwardly inclined and mounted below the lower end of said arm for the support of said end, a pedal longitudinally disposed above said arm, said pedal pivotally mounted between its ends on and between the ends of said arm.

6. In a device of the class described, the combination with an upwardly extended brake actuating lever, of a pedal supporting arm pivotally connected to said lever at a fixed point near the upper end thereof and extended downwardly and rearwardly from said lever, a member having its upper surface forwardly and upwardly inclined and mounted below the lower end of said arm for the support of said end, a pedal longitudinally disposed above said arm, said pedal pivotally mounted between its ends on and between the ends of said arm, and a connection operatively uniting said pedal to a part to be operated upon its movement in one direction.

7. In a device of the class described, the combination with an upwardly extended brake actuating lever, of a pedal supporting arm pivotally connected to said lever at a fixed point near the upper end thereof and extended downwardly and rearwardly from said lever, a member having its upper surface forwardly and upwardly inclined and mounted below the lower end of said arm for the support of said end and provided with a stop to co-act with the lower end of said arm, a pedal longitudinally disposed above said arm, said pedal pivotally mounted between its ends on and between the ends of said arm.

8. In a device of the class described, the combination with an upwardly extended brake actuating lever, of a pedal supporting arm pivotally connected to said lever at a fixed point near the upper end thereof and extended downwardly and rearwardly from said lever, a member having its upper surface forwardly and upwardly inclined and mounted below the lower end of said arm for the support of said end and provided with a stop to co-act with the lower end of said arm, a pedal longitudinally disposed above said arm, said pedal pivotally mounted between its ends on and between the ends of said arm, and a connection operatively uniting said pedal to a part to be operated upon its movement in one direction.

WILLIAM DAVIS.